G. KLIMEK.
HOSE CLAMP.
APPLICATION FILED JUNE 30, 1917.
1,264,659. Patented Apr. 30, 1918.
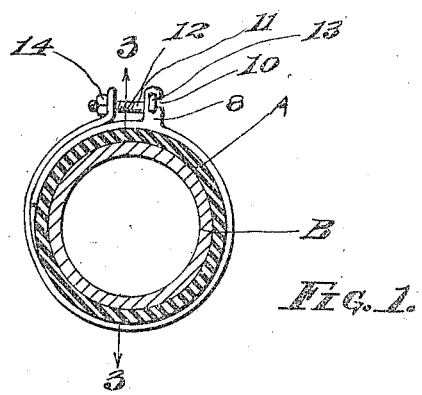
Fig. 1.
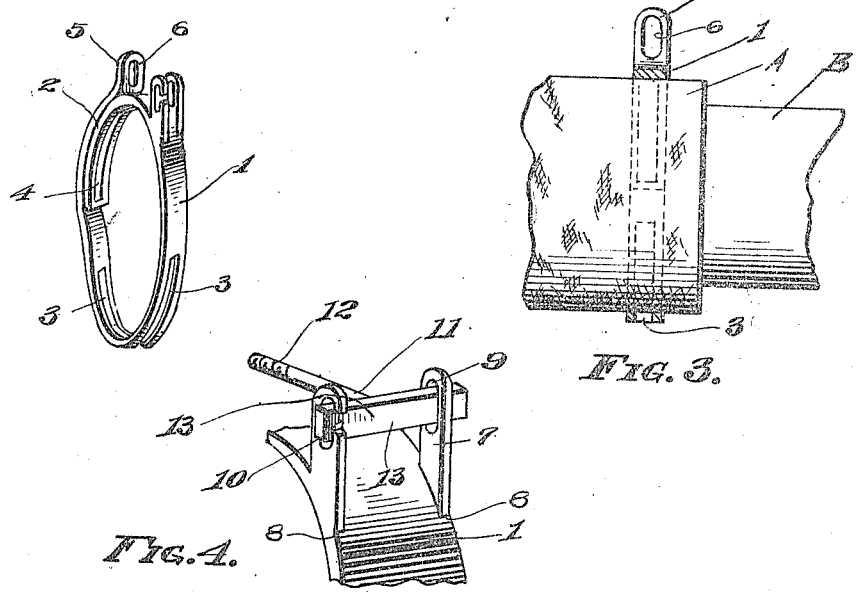
Witnesses
Inventor
G. KLIMEK.
By
Attorney

UNITED STATES PATENT OFFICE.

GUST KLIMEK, OF LAURIUM, MICHIGAN.

HOSE-CLAMP.

1,264,659. Specification of Letters Patent. Patented Apr. 30, 1918.

Application filed June 30, 1917. Serial No. 177,852.

*To all whom it may concern:*

Be it known that I, GUST KLIMEK, a citizen of the United States, residing at Laurium, in the county of Houghton and State of Michigan, have invented certain new and useful Improvements in Hose-Clamps; and I do hereby declare the following to be a full, clear, and exact description of the invention, such as will enable others skilled in the art to which it appertains to make and use the same.

This invention relates to improvements in hose clamps.

The object of this invention is to provide a hose clamp to facilitate the connecting of the adjacent ends of the hose together or can be used for rigidly clamping a nipple in one end of the hose.

Another object of this invention is to provide a hose clamp formed of a single strip of bendable material and provided with attaching lugs to facilitate the receiving of a bolt for holding the clamp about the exterior of the hose or the like.

A further novelty of this invention is to provide the clamp with a pair of spaced lugs in which is adapted to be arranged, the head of a T-bolt so, that the bolt will be held from turning when it is desired to fit the nut thereon or remove the same therefrom, thus facilitating the placing of the clamp on a hose or the like in a quick and easy manner.

A further object of this invention is to provide a hose clamp of this character, which will be simple, practical and comparatively inexpensive in construction, and one that can be manufactured and sold at a low cost.

With these and other objects in view, the invention consists in the novel combination and arrangement of parts hereinafter more fully described and set forth in the claim hereto appended.

In the drawing:

Figure 1 is a sectional view illustrating the clamp as applied to a hose for clamping a nipple therein.

Fig. 2 is a perspective view of the clamp as made in accordance with this invention, Fig. 3 is a sectional view taken on the line 3—3 of Fig. 1.

Fig. 4 is an enlarged fragmentary perspective view illustrating the bolt holding lugs.

Like numerals of reference designate corresponding parts in all the figures of the drawings.

Referring to the drawings, the numeral 1 designates the hose clamp and it is formed of suitable bendable material, such as metal, steel or the like and the clamp is substantially circular and has its ends overlapped as at 2. The body of the clamp is provided intermediate its ends with a longitudinally extending arcuate slot 3 and the inner overlapped end is provided with a longitudinally extending slot 4. The slots 3 and 4 in the hose clamp are adapted to have a portion of the hose upon which they are clamped forced therein, thus preventing longitudinal or circumferential movement of the clamp with relation to the material of the hose upon which it is clamped.

The outer overlapped end has its terminal bent outwardly as at 5 and apertured as at 6 and constitutes a bolt receiving lug. The body 1 is provided adjacent its inner overlapped end with a pair of spaced upstanding ears or lugs 7, which lugs are formed on the opposite side edges of the clamp 1 as shown at 8. Each of the lugs 7 are provided with transversely alined vertically arranged openings 9. One of the openings 9 opens out through one vertical side edge of its respective lug as at 10, the purpose of which will be hereinafter more fully described.

A T-shaped bolt 11 has an exterior threaded shank 12, and the head 13 at one end thereof. The head 13 is tilted slightly at an angle to the lugs 7, the lower edge of the head is fitted in the openings 10 of one lug until the head may be moved into the opening 9 and the shank at right angles to the lugs 11 permitting the upper and lower walls of the opening 10 to engage the outer side of the head 13 and retain the bolt therein. The head is then moved endwise to the left until the other end of the head can be inserted in the opening 9 of the other lug thereby holding the bolt against rotation after the threaded shank 12 has been fitted through the opposite face of the lug 5 and the nuts fitted thereon. The nut is designated by the numeral 14 and when it is fitted upon the bolt 11 and turned, the bolt will be held against turning by the head fitting in the opening 9 of its respective lug 7.

In use, the clamp is arranged upon the hose designated A, facilitating the securing of a nipple B tightly therein. The bolt has one end of its head arranged in the aperture 9 of one lug and the opposite end of the head is arranged in the aperture 9 of the other lug, thus the bolt head is positioned in the lug 7. The threaded shank is then forced through the aperture 6 of the lug 5 and the nut 14 is fitted thereon and threaded up on the bolt until the desired clamping action is obtained and the nipple B is rigidly held against displacement from the section of the hose A, as clearly shown in Fig. 1.

It is to be understood that the slots 3 and 4 in the clamp 1 are adapted to have squeezed or forced therein by pressure, portions of the material from which the hose section is made, thus preventing circumferential or longitudinal movement of the clamp with relation thereto.

What is claimed is:

A hose clamp comprising a band formed of a single length of bendable material having overlapped ends, the outer overlapped end having its terminal bent upwardly to provide an apertured lug, a pair of transversely arranged relatively spaced apertured lugs formed integrally with the exterior of and extending laterally from the inner overlapped end adjacent the terminal thereof, and a T-shaped bolt having its head removably arranged in the apertured lug of the inner overlapped end and its shank extending through the apertured lug of the outer overlapped end, and means adjustably fitted on the shank of the bolt to draw the overlapped ends toward one another to facilitate the clamping of the band upon a hose section.

In testimony whereof I affix my signature in presence of two witnesses.

GUST KLIMEK.

Witnesses:
RICHARD A. MARTIN,
URIAH C. PENBERTTER.